United States Patent
Liu et al.

(10) Patent No.: US 12,332,155 B2
(45) Date of Patent: Jun. 17, 2025

(54) PREPARATION METHOD FOR IRON-BASED ALLOY POWDER EBSD TEST SAMPLE

(71) Applicant: CENTRAL SOUTH UNIVERSITY, Changsha (CN)

(72) Inventors: Zuming Liu, Changsha (CN); Quan Li, Changsha (CN); Boyun Huang, Changsha (CN); Xueqian Lv, Changsha (CN); Kai Peng, Changsha (CN); Fan Zhao, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 1191 days.

(21) Appl. No.: 17/260,560

(22) PCT Filed: Aug. 30, 2018

(86) PCT No.: PCT/CN2018/103114
§ 371 (c)(1),
(2) Date: Jan. 15, 2021

(87) PCT Pub. No.: WO2020/019400
PCT Pub. Date: Jan. 30, 2020

(65) Prior Publication Data
US 2021/0270706 A1 Sep. 2, 2021

(30) Foreign Application Priority Data
Jul. 27, 2018 (CN) .......................... 201810846725.0

(51) Int. Cl.
*G01N 1/36* (2006.01)
*C23C 18/16* (2006.01)
(Continued)

(52) U.S. Cl.
CPC ........... *G01N 1/36* (2013.01); *C23C 18/1637* (2013.01); *C23C 18/1646* (2013.01);
(Continued)

(58) Field of Classification Search
CPC  G01N 1/28; G01N 1/286; G01N 1/32; G01N 1/36; G01N 2001/2866;
(Continued)

(56) References Cited

FOREIGN PATENT DOCUMENTS

CN          1420349 A      5/2003
CN        102296286 A     12/2011
(Continued)

OTHER PUBLICATIONS

Computer-generated translation of CN1420349A (Hu et al.), original copy published on May 28, 2003 (May 28, 2003). (Year: 2003).*
(Continued)

*Primary Examiner* — Anessa T. Luk
(74) *Attorney, Agent, or Firm* — Bayramoglu Law Offices LLC

(57) ABSTRACT

A preparation method for an iron-based alloy powder EBSD test sample includes the following steps: surface electrolytic activation of an iron-based powder; ultrasonically cleaning the powder, and drying the powder to obtain a surface activated powder; adding the surface activated powder to a chemical embedding solution for ultrasonic dispersion; after the ultrasonic dispersion, performing a plating process; then heating to 80-92° C. for chemical reaction to prepare an iron-based alloy bulk which coated with nickel. The plating process is as follows: still standing, stirring, and repeating the still standing is taken as a cycle, and at least one cycle is performed to complete the plating process. Then grinding and electropolishing are done to the obtained iron-based alloy bulk coated with nickel to obtain the iron-based alloy powder EBSD test sample.

10 Claims, 2 Drawing Sheets

(51) Int. Cl.
  *C23C 18/18* (2006.01)
  *C23C 18/36* (2006.01)
  *C23F 17/00* (2006.01)
  *C25F 3/06* (2006.01)
  *C25F 3/24* (2006.01)
  *G01N 1/28* (2006.01)
  *G01N 23/203* (2006.01)
  *C25F 1/06* (2006.01)

(52) U.S. Cl.
  CPC ........ *C23C 18/1676* (2013.01); *C23C 18/168* (2013.01); *C23C 18/1844* (2013.01); *C23C 18/36* (2013.01); *C23F 17/00* (2013.01); *C25F 3/06* (2013.01); *C25F 3/24* (2013.01); *G01N 1/286* (2013.01); *G01N 23/203* (2013.01); *C25F 1/06* (2013.01); *G01N 2001/2866* (2013.01); *G01N 2223/053* (2013.01)

(58) Field of Classification Search
  CPC ..... G01N 2001/4038; G01N 23/20058; G01N 23/203; G01N 23/2202; G01N 23/2206; G01N 2223/053; G01N 2223/056; G01N 2223/0565; C23C 18/16; C23C 18/1633; C23C 18/1635; C23C 18/1637; C23C 18/1646; C23C 18/1655; C23C 18/166; C23C 18/1664; C23C 18/1666; C23C 18/1675; C23C 18/1676; C23C 18/168; C23C 18/1683; C23C 18/1689; C23C 18/18; C23C 18/1803; C23C 18/1831; C23C 18/1834; C23C 18/1841; C23C 18/1844; C23C 18/1848; C23C 18/31; C23C 18/32; C23C 18/34; C23C 18/36; C23C 18/54
  See application file for complete search history.

(56) References Cited

FOREIGN PATENT DOCUMENTS

| CN | 102721715 A | 10/2012 |
|----|-------------|---------|
| CN | 107228870 A | 10/2017 |

OTHER PUBLICATIONS

Translation of Wang Lianwei et al., "Method for preparing transmission electron microscope thin film samples using metal powder," Physical Test, Issue 3, published Dec. 31, 1999, pp. 24, 25, 34. (Year: 1999).*

Lianwei Wang et al., Method for Preparing Thin Film Samples of Transmission Electron Microscope With Metal Powder, Physical Test, Dec. 31, 1999, pp. 24-25, 34.

Electrolytic Polishing and Corrosion Rules of Metal Samples, Aug. 9, 2013, drbkj32042.

* cited by examiner

PREPARATION METHOD FOR IRON-BASED ALLOY POWDER EBSD TEST SAMPLE

CROSS REFERENCE TO THE RELATED APPLICATIONS

This application is the national phase entry of International Application No. PCT/CN2018/103114, filed on Aug. 30, 2018, which is based upon and claims priority to Chinese Patent Application No. 201810846725.0, filed on Jul. 27, 2018, the entire contents of which are incorporated herein by reference.

TECHNICAL FIELD

The present disclosure relates to a preparation method for an iron-based alloy powder EBSD test sample, and belongs to the technical field of special material characterization.

BACKGROUND

Electron backscatter diffraction (EBSD) technology is a characterization technique to identify the metal and alloys crystal structure, texture and phase information etc. Usually, diffraction Kikuchi bands which are stimulated by electron beam from an inclined sample surface could be detected by a scanning electron microscope (SEM) equipped with EBSD detector.

Oxide dispersion strengthened (ODS) alloy powder as raw material is crucial for preparing high-performance ODS alloys, its microstructure, morphology, texture intensity and component distribution will significantly affect the comprehensive properties of ODS alloys. The reliability of EBSD results is closely related to the qualities of test samples. Therefore, preparing high-quality EBSD test sample of alloy powder (including ferromagnetic alloy powder) is a key to obtain the alloy powder microstructure, morphology, and texture intensity and component distribution. Recently, profuse studies focus on the EBSD test sample preparation of bulk materials and film materials, but there are rare results related to metal or alloy powder ($\leq 150$ μm) material which is mainly attributed to the lack of techniques of powder EBSD test sample preparation.

As well known, the requirements of the EBSD test on the test sample are as follows: (1) effectively conductive connection between the sample and the sample holder, (2) nanoscale roughness of the sample observation surface, and (3) no residual stress at the depth of 1-5 μm on the sample surface.

A traditional method is to embed powders into resin (phenolic resin or conductive resin), then subject to grinding, mechanical polishing and vibration polishing to obtain the EBSD test sample. Usually, after vibration polishing with non-conductive phenolic resin inlaid powder, the polished surface of the sample needs to be plated with a carbon coating to get a good conductivity. However, in order to guarantee a well detection of backscatter electrons, the plated carbon coating thickness needs to be less than 5 nm. Hence, general devices are hardly suitable for this requirement.

Chinese patent CN107228870A discloses an EBSD test sample preparation method for a cemented carbide (WC) powder, wherein the cemented carbide powder and electrolytic Cu powder are mixed in a certain proportion, then compacted and sintered; and then ground, polished, and surface cleaned to obtain the EBSD test sample. Note that, this method includes powder mixing and pre-sintering, which could affect the original microstructure of the cemented carbide powder, and is only suitable for high-melting-point refractory metals or alloys. In comparison, EBSD analysis usually requires maintaining the original microstructure of powder, especially mechanical alloyed powder/ball milled powder microstructure, which is very sensitive to the sinter temperature. Therefore, this method is not well suitable for preparing EBSD test sample of the mechanical alloyed powder.

In order to resolve above problems, the present disclosure provides a method for preparing EBSD test sample of metal and alloy powder by embedding the iron-based powder in nickel via electroless plating and then surface treating by electrical polishing for the first time, which is suitable for preparing EBSD test sample of atomized and mechanical alloyed powder. Note that, this preparation method fundamentally solves the problem of sample conductivity, the powder surface polishing difficulty, and efficiently reduces the residual stress on the surface of the powder EBSD test sample. This method for the alloy powder EBSD test sample preparation appears for the first time, no public relevant research result has been publicly reported.

SUMMARY

Technical Problems

The present disclosure provides a preparation method for an iron-based alloy powder EBSD test sample.

The key technical problems encountered during the development of the present disclosure are as follows:

(1) Design of Iron-Based Alloy Powder Inlaying System

In the development process, various inlaying solutions have been designed for the iron-based alloy powder, including physical bonding: resin cold inlaying/hot inlaying, bakelite powder warm inlaying, quick adhesive cold bonding, and molten bonding by low-melting-point metal such as Pb and Sn etc.; mechanical compacting: mixed powder compacting with ductile metal powders such as Pb, Sn, Cu and Al etc.; and chemical bonding: chemical elements, including Fe, Cr, Cu, Al, Ni, etc. are used for chemical embedding.

Physical bonding: Effective interface bonding between iron-based powder and resin cannot be formed, which results in powder friability; or change in the original powder microstructure due to heating; or abundant characterization noises due to nonconductivity of sample.

Mixed powder compacting: Ductile metal powders such as Pb, Sn and Cu are used for mixed compacting. In this method, the iron-based alloy powder undergoes plastic deformation, and the interface bonding strength between iron-based alloy powders and metal powders is low, resulting in powder friability and falling off, and the sample preparation cannot be completed.

Chemical bonding: Fe, Cr, Cu, Al, Ni, etc. are used for chemical embedding. Especially for Fe, Cr, Cu, and Al, effective deposition is difficult to form on the surfaces of the iron-based powders, and the embedding effect is poor, which results in that electropolishing cannot be performed. Fe, Cr, Cu and Al are plated onto the surface of the iron-based powder by an electric plating method, and a plating film falls when the thickness develops to 1 μm, which is hard to prepare an EBSD test sample.

In view of the above problems, various technical solutions such as electric plating and chemical plating, and various solution systems have been designed, and comprehensive experiments have been implemented to finally design the technical solution of the present disclosure. Ni is used for chemical plating due to its good conductivity and strength.

(2) Iron-Based Powder Surface Activation

In the development process, incompact embedding or plating film falling phenomenon occurs normally. Hence, surface activation pre-treatment of powder is crucial to achieve good interface combination of powders and plated metal film before chemical plating.

(3) Control of Chemical Plating Temperature

In the development process, it is found that the deposited film growth rate of plating metal is closely related to the temperature and quite different at different temperature, and the deposit rate increases with the temperature growth. The chemical reaction will not happen under a low temperature, while Ni nucleating in solution under a high temperature. When the temperature is too low, the chemical reaction rate is too slow to produce effective deposited film/coating; When the temperature is too high, the reaction rate will be high, and nickel will self-nucleate and grow in the solution, but cannot grow on the powder surface.

(4) Powder Laying During Chemical Plating

Additionally, the powder laying density greatly affects the final embedding compactness, so the powder laying thickness is required to be homogeneous before embedding.

The present disclosure gradually forms the solution and the optimization solution of the present disclosure in the process of solving the above problems.

Technical Solutions

The present disclosure provides a preparation method for an iron-based alloy powder EBSD test sample, including the following steps:

Step 1

Iron-based powder surface electrolytic activation: soaking iron-based powders into an electrolytic solution for surface activation by an electrolytic activation to obtain an activated powder, and then cleaning the activated powder by absolute ethanol and/or absolute methanol via ultrasonic cleaning; finally, drying the activated powder to obtain a surface activated powder;

Step 2

Adding the surface activated powder to a chemical embedding solution, then dispersing the surface activated powder by ultrasonic to obtain a mixture; then performing process A; and then heating the mixture to 80-92° C., preferably 88-92° C., for a chemical reaction, to obtain an iron-based alloy bulk coated with Ni. Wherein the process A is as follows: the process of still standing, stirring, and repeating still standing is taken as a cycle, and at least one cycle is performed to complete the process A. Wherein the chemical embedding solution includes the following components:

28-32 g/L of nickel chloride, preferably 30 g/L;
15-30 g/L of sodium hypophosphite;
14-16 g/L of sodium acetate, preferably 15 g/L;
14-16 g/L of sodium citrate, preferably 15 g/L;
4-6 g/L of succinic acid, preferably 5 g/L;
5-15 g/L of glycine;
1-3 vol. % of glycerol;
1-3 vol. % of glacial acetic acid, preferably 2 vol. %.

The pH value of the embedding solution is 3.5-5.4, preferably 4.0-5.4; and

Step 3 grinding and electropolishing the iron-based alloy bulk coated with nickel obtained in step 2 to obtain the iron-based alloy powder EBSD test sample.

According to the preparation method for the iron-based alloy powder EBSD test sample provided by the present disclosure, the iron-based alloy powder is a gas-atomized Fe-based alloy powder, or a mechanical alloyed iron-based alloy powder, or an iron-based alloy powder prepared by ball milling.

According to the preparation method for the iron-based alloy powder EBSD test sample provided by the present disclosure, the average particle size of the iron-based alloy powder is less than or equal to 150 µm.

According to the preparation method for the iron-based alloy powder EBSD test sample provided by the present disclosure, during industrial application, the electrolytic activation in step 1 is as follows: filling the iron-based alloy powder into a spoon-shaped copper electrode to perform electrolytic activation on the powder surface; and cleaning the activated powder with absolute ethanol using an ultrasonic cleaning, and drying the activated powder for subsequent use. In the present disclosure, after the treatment in step 1, the as activated powder is suitable for chemical plating of Ni.

According to the preparation method for the iron-based alloy powder EBSD test sample provided by the present disclosure, the electrolyte in step 1 is composed of the following components: 0.5-1 wt. % of perchloric acid, 0.05-0.15 wt. % of glycerol and the balance of absolute ethanol or absolute methanol.

According to the preparation method for the iron-based alloy powder EBSD test sample provided by the present disclosure, in step 1, a time of the electrolytic activation is 30-60 s, and a temperature of the electrolytic activation is 25-30° C.

According to the preparation method for the iron-based alloy powder EBSD test sample provided by the present disclosure, in step 1, a time of the ultrasonic cleaning is 10-15 min, and the absolute ethanol and/or the absolute methanol are/is replaced for 2-3 times during the times of the ultrasonic cleaning.

According to the preparation method for the iron-based alloy powder EBSD test sample provided by the present disclosure, in step 2, the surface activated powder is added into the chemical embedding solution according to a solid-to-liquid mass ratio of (1-3):500.

According to the preparation method for the iron-based alloy powder EBSD test sample provided by the present disclosure, in step 2, a time of the ultrasonic dispersion is 10-15 min.

According to the preparation method for the iron-based alloy powder EBSD test sample provided by the present disclosure, in step 2, a time of each of the still standing is 30-60 min; and a speed of the stirring is 100-120 r/min, and a time of each of the stirring is 3-5 min; a time of each of repeating the still standing is 30-60 min. Through the process A, uniform deposition of the powder at the bottom of a chemical plating container is achieved. The above operations provide necessary conditions for subsequent heating nickel plating to obtain the bulk.

According to the preparation method for the iron-based alloy powder EBSD test sample provided by the present disclosure, in step 2, after the process A, heating the mixture to 80-92° C., preferably 88-92° C., for the chemical reaction for 2-3.5 hrs. The nickel growth rate is controlled at 30-50 µm/h during the chemical reaction. During industrial application, when the components of the chemical embedding solution are determined, the nickel growth rate is controlled by strictly controlling the temperature. In the exploring process of the present disclosure, it is found that too fast or too slow formation rate of nickel is adverse to obtaining a compact bulk, resulting in incapability of preparing an EBSD test sample meeting requirements.

According to the preparation method for the iron-based alloy powder EBSD test sample provided by the present disclosure, after the chemical reaction, the iron-based alloy bulk coated with nickel is regulated to 10×10 mm, and a thickness of 50-200 μm.

According to the preparation method for the iron-based alloy powder EBSD test sample provided by the present disclosure, the iron-based alloy bulk coated with nickel is flatly ground by waterproof sandpaper of 400-2000 meshes, and is finally polished by SiC sandpaper of 2000-3000 meshes, and no obvious scratch exists on the surface of the sample.

According to the preparation method for the iron-based alloy powder EBSD test sample provided by the present disclosure, in step 3, the electropolishing solution is composed of 3-10 wt. % of perchloric acid, 1-2 wt. % of glacial acetic acid, 0.5-1 wt. % of phosphoric acid, 1-2 wt. % of glycerol and the balance of the absolute methanol and/or the absolute ethanol.

According to the preparation method for the iron-based alloy powder EBSD test sample provided by the present disclosure, in the electropolishing process, a stainless steel plate with a size of 5×3 cm is used as a cathode, the iron-based alloy bulk coated with nickel to be electropolished is used as an anode, a sample clamp is pure copper, a polishing surface right faces the cathode, and an electrolysis is performed by applying a constant voltage of 3-6 V at room temperature for 10-30 s to obtain the iron-based alloy powder EBSD test sample.

Beneficial Effects (1) According to the preparation method for the iron-based alloy powder EBSD test sample provided by the present disclosure, it is firstly proposed to use a chemical nickel plating method to embed the iron-based metal powder, and then the electropolishing process is carried out to prepare the iron-based powder EBSD test sample. It solves the problem that the powder (especially the iron-based alloy powder) EBSD test sample cannot be prepared.

(2) According to the preparation method for the iron-based alloy powder EBSD test sample provided by the present disclosure, the electropolishing process is used for preparing the iron-based powder EBSD test sample, and is applicable to an atomized iron-based powder and a mechanical alloying powder. By using the electropolishing process, a flat and well-polished to-be-tested surface of the sample can be obtained, residual stress on the to-be-tested surface of the powder EBSD test sample is completely eliminated, and a good sample is provided for EBSD test.

(3) According to the preparation method for the iron-based alloy powder EBSD test sample provided by the present disclosure, the powder surface is pre-activated by an electrolytic method to solve the problem of bonding the embedding metal and the powder surface during chemical embedding.

(4) According to the preparation method for the iron-based alloy powder EBSD test sample provided by the present disclosure, by strictly controlling the chemical nickel plating process and the deposition mode, a compact bulk material is obtained, and the powder is made into the bulk in a nondestructive way, and the problem that the powder cannot be electropolished is solved.

(5) According to the preparation method for the iron-based alloy powder EBSD test sample provided by the present disclosure, by strictly controlling the deposition mode, the reaction temperature and the content of the embedding reaction solution, the embedding rate can be effectively regulated and controlled, and the bulk material with the controllable powder embedding thickness can be obtained.

(6) According to the preparation method for the iron-based alloy powder EBSD test sample provided by the present disclosure, by selecting nickel to embed the iron-based powder, the embedding powder can be effectively polished by the electropolishing process.

BRIEF DESCRIPTION OF THE DRAWINGS

As illustrated in FIG. 1, the iron-based alloy powders are compactly embedded, which shows a good bonding, and is suitable for EBSD testing.

As illustrated in FIG. 2, the iron-based alloy powders are electropolished, layered structures of ball milled powder are prominent.

Figure 3:
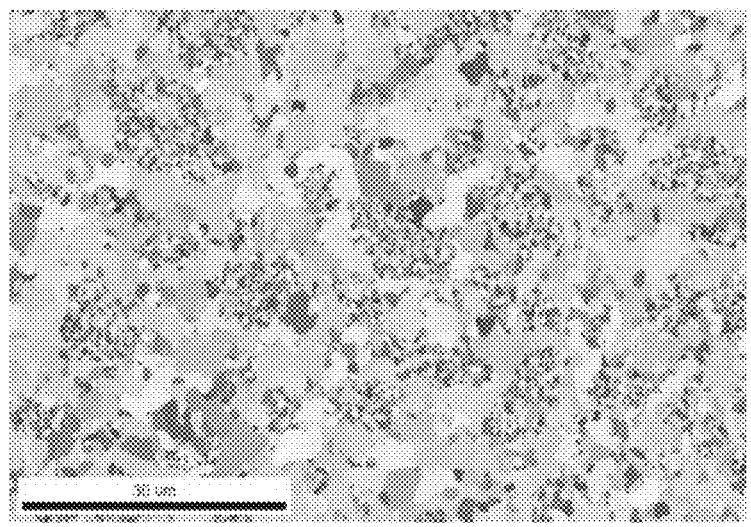
FIG. 3 presents an EBSD image of the iron-based alloy powder in Example 1 of the present disclosure.

The IPF result of iron-based alloy powder by EBSD observation was shown in FIG. 3. The result suggests texture information and the grain size distribution. Especially, the coarse grains are iron-based powder, while fine grains are deposited Ni. In summary, the texture and grain size distribution information are well detected.

DETAILED DESCRIPTION OF THE EMBODIMENTS

Example 1

Firstly, 2 g of Fe-14Cr-3W-0.4Ti-0.5$Y_2O_3$ mechanical alloying powder was weighed, and was cleaned for 10 min in an absolute ethanol by an ultrasonic cleaning. The absolute ethanol was replaced twice during the ultrasonic cleaning. The cleaned powder was dried after being filtered. Then, the following operations were performed:

Step 1: The cleaned and dried powder was filled into a spoon-shaped copper electrode and then soaked into an activation electrolyte to perform surface activation to obtain an activated powder. Wherein the activation electrolyte was composed of 0.5% of perchloric acid, 0.1% of glycerol and the balance of the absolute methanol, and the activation time was 30 s. After the electrolytic activation, cleaning the activated powder by the absolute ethanol and/or absolute methanol via ultrasonic cleaning for 10 min, and filtrating and then drying the activated powder to obtain a surface activated powder.

Step 2: The surface activated powder was added into a chemical nickel plating solution to perform ultrasonic dispersion for 10 min. Wherein the used chemical nickel plating solution was composed of 30 g of nickel chloride, 15 g of sodium hypophosphite, 15 g of sodium acetate, 15 g of sodium citrate, 5 g of succinic acid, 5 g of glycine, 10 ml of glycerol, 20 ml of glacial acetic acid and 970 ml of distilled water. The pH value of the solution was 4.0. After the ultrasonic dispersion, process A was performed. The used process A was as follows: ultrasonic dispersion was performed for 10 min; then still standing was performed for 0.5 h; next, stirring was performed for 3 min at a stirring speed of 100 r/min; and next, repeating still standing was performed for 0.5 h. Next, the chemical nickel plating solution containing the iron-based alloy powder prepared by the process A was heated to 85+/−5° C. for the chemical reaction for 2 hrs, an iron-based alloy bulk coated with nickel was obtained. The size of the alloy bulk was regulated to 10×10 mm, and a thickness of 115 μm.

Step 3: The sample of iron-based alloy bulk coated with nickel obtained in step 2 was flatly ground by waterproof sandpaper of 400-2000 meshes, and the sample was then polished by SiC sandpaper of 2000 meshes. Then, the iron-based alloy bulk coated with nickel was soaked into an electrolyte for electropolishing to obtain a Fe-14Cr-3W-0.4Ti-0.5$Y_2O_3$ mechanical alloying powder EBSD test sample. The electropolishing solution used in this step was composed of 6 ml of perchloric acid, 2 ml of glacial acetic acid, 1 ml of phosphoric acid, 2 ml of glycerol and 89 ml of absolute methanol. In this step, during electropolishing, the iron-based alloy bulk coated with nickel was used as an anode, a stainless steel plate was used as a cathode (the size was 5×3 cm), a sample clamp was pure copper, a polishing surface right faced a cathode plate, and the electrolysis was performed by applying a constant voltage of 3 V at room temperature for 15 s.

Figure 1:
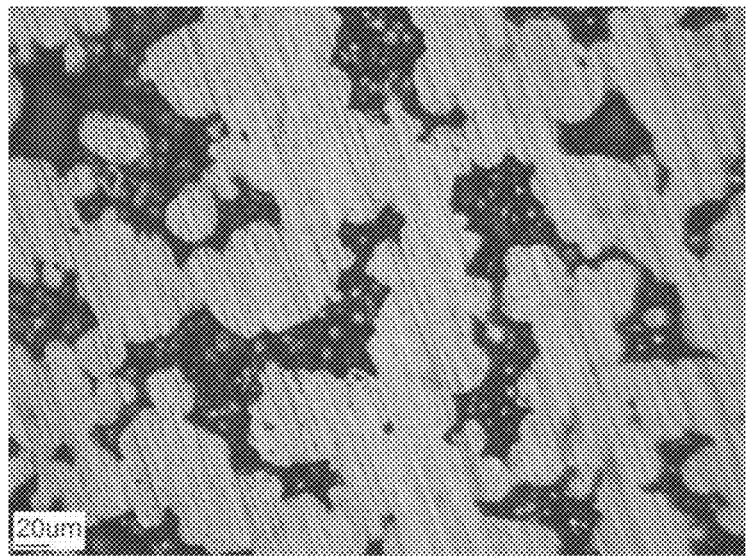
FIG. 1 presents an optical microscope (OM) image of the surface of the iron-based powder embedded with Ni by chemical plating in Example 1 of the present disclosure.

FIG. 1 presents an OM image of the sample obtained by grinding an iron-based powder chemical nickel plating embedding sample prepared in Example 1.

Figure 2:
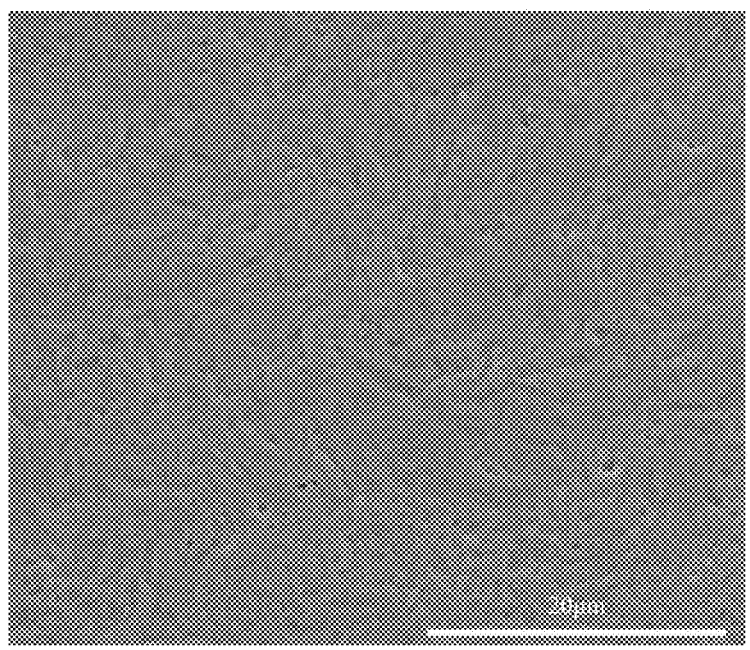
FIG. 2 presents a scanning electron microscope (SEM) image of embedded iron-based alloy powder surface. The sample prepared in Example 1 of the present disclosure is electropolished.

FIG. 2 presents an SEM image of the surface of a powder after the iron-based powder chemical nickel plating embedding sample prepared in Example 1 was electropolished. Pattern type bulges in the image were caused by multi-time powder cold welding on ball milled powder.

FIG. 3 presents an EBSD image of the powder in Example 1.

Example 2

Firstly, 2 g of Fe-14Cr-3W-0.4Ti-1.0$Y_2O_3$ mechanical alloying powder was weighed, and then cleaned for 10 min in an absolute ethanol by an ultrasonic cleaning. The absolute ethanol was replaced twice during the ultrasonic cleaning. The cleaned powder was dried after being filtered. Then, the following operations were performed:

Step 1: The cleaned and dried powder was filled into a spoon-shaped copper electrode and then was soaked into an activation electrolyte to perform electrolytic activation to obtain an activated powder. The used activation electrolyte was composed of 1% of perchloric acid, 0.1% of glycerol and the balance of the absolute methanol, and the activation time was 60 s. After the electrolytic activation, cleaning the activated powder by the absolute ethanol and/or absolute methanol using ultrasonic cleaning for 10 min, and filtrating and then drying the activated powder to obtain a surface activated powder.

Step 2: The surface activated powder was added into a chemical nickel plating solution to perform ultrasonic dispersion for 10 min. Wherein the used chemical nickel plating solution was composed of 28 g of nickel chloride, 15 g of sodium hypophosphite, 14 g of sodium acetate, 14 g of sodium citrate, 4 g of succinic acid, 4 g of glycine, 10 ml of glycerol, 20 ml of glacial acetic acid and 970 ml of distilled water. The pH value of the solution was 5.4. After ultrasonic dispersion, process A was performed. The used process A was as follows: ultrasonic dispersion was performed for 10 min; then still standing was performed for 0.5 h; next, stirring was performed for 3 min at a stirring speed of 100 r/min; and next, repeating still standing was performed for 0.5 h. Next, the chemical nickel plating solution containing the iron-based alloy powder prepared by the process A was heated to 85+/−5° C. for the chemical reaction for 1 h, an iron-based alloy bulk coated with nickel was obtained. The size of the iron-based alloy bulk coated with nickel was regulated to 10/10 mm, and a thickness of 45 μm.

Step 3: The iron-based alloy bulk coated with nickel obtained in step 2 was flatly ground by waterproof sandpaper of 400-2000 meshes, and the sample was then polished by SiC sandpaper of 2000 meshes. Then, the iron-based alloy bulk coated with nickel was soaked into an electrolyte for electropolishing to obtain a Fe-14Cr-3W-0.4Ti-1.0$Y_2O_3$ mechanical alloying powder EBSD test sample. The electropolishing solution used in this step was composed of 6 ml of perchloric acid, 2 ml of glacial acetic acid, 1 ml of phosphoric acid, 2 ml of glycerol and 89 ml of absolute methanol. In this step, during electropolishing, the iron-based alloy bulk coated with nickel was used as an anode, a stainless steel plate was used as a cathode (the size was 5×3 cm), a sample clamp was pure copper, a polishing surface right faced a cathode plate, and the electrolysis was performed by applying a constant voltage of 6 V at room temperature for 20 s.

Comparative Example 1

Firstly, 2 g of Fe-14Cr-3W-0.4Ti-0.25$Y_2O_3$ mechanical alloying powder was weighed, and then was cleaned for 10 min in absolute ethanol by an ultrasonic cleaning. The absolute ethanol was replaced twice during the ultrasonic cleaning. The cleaned powder was dried after being filtered. Then, the following operations were performed:

Step 1: The cleaned and dried powder was added into a chemical nickel plating solution to perform ultrasonic dispersion for 10 min. Wherein the used chemical nickel plating solution was composed of 30 g of nickel chloride, 15 g of sodium hypophosphite, 15 g of sodium acetate, 15 g of sodium citrate, 5 g of succinic acid, 5 g of glycine, 10 ml of glycerol, 20 ml of glacial acetic acid and 970 ml of distilled water. The pH value of the solution was 4.0. After ultrasonic dispersion, process A was performed. The used process A was as follows: ultrasonic dispersion was performed for 10 min; then, still standing was performed for 0.5 h; next, stirring was performed for 3 min at a stirring speed of 100 r/min; and next, repeating still standing was performed for 0.5 h. Next, the chemical nickel plating solution containing the iron-based alloy powder prepared by the process A was heated to 85+/−5° C. for chemical reaction for 2 hrs.

Since the powder was not activated, the powder could not agglomerate in the embedding process, and was still loose powder after the reaction for 2 hrs, and the embedding failed.

Comparative Example 2

Firstly, 2 g of Fe-14Cr-3W-0.4Ti-1.0$Y_2O_3$ mechanical alloying powder was weighed, and was cleaned for 10 min in absolute ethanol by an ultrasonic cleaning. The absolute ethanol was replaced twice during the ultrasonic cleaning. The cleaned powder was dried after being filtered. Then, the following operations were performed:

Step 1: The cleaned and dried powder was filled into a spoon-shaped copper electrode and was soaked into an activation electrolyte to perform electrolytic activation to obtain an activated powder. Where the used activation electrolyte was composed of 0.5% of perchloric acid, 0.1% of glycerol and the balance of absolute methanol. The activation time was 30 s. After the electrolytic activation, cleaning the activated powder by absolute ethanol and/or absolute methanol using ultrasonic cleaning for 10 min, and filtrating and then drying were performed to obtain a surface activated powder.

Step 2: The surface activated powder was added into a chemical nickel plating solution to perform ultrasonic dispersion for 10 min, and then still standing was performed for 0.5 h. The used chemical nickel plating solution was composed of 30 g of nickel chloride, 15 g of sodium hypophosphite, 15 g of sodium acetate, 15 g of sodium citrate, 5 g of succinic acid, 5 g of glycine, 10 ml of glycerol, 20 ml of glacial acetic acid and 970 ml of distilled water. The pH value of the solution was 4.0. The chemical nickel plating solution containing the iron-based alloy powder was heated to 85+/−5° C. for chemical reaction for 4 hrs.

Since the chemical nickel plating solution containing the iron-based alloy powder was not stirred and still stood for many times, the obtained powder was not homogeneously laid, no compact embedding metal bulk could be formed even after the reaction for 4 hrs, and the embedding failed.

Comparative Example 3

Firstly, 2 g of Fe-14Cr-3W-0.4Ti-0.5$Y_2O_3$ mechanical alloying powder was weighed, and was cleaned for 10 min in absolute ethanol by an ultrasonic cleaning. The absolute ethanol was replaced twice during the ultrasonic cleaning. The cleaned powder was dried after being filtered. Then, the following operations were performed:

Step 1: The cleaned and dried powder was filled into a spoon-shaped copper electrode and was soaked into an activation electrolyte to perform electrolytic activation to obtain an activated powder. Wherein the used activation electrolyte was composed of 0.5% of perchloric acid, 0.1% of glycerol and the balance of absolute methanol. The activation time was 30 s. After the electrolytic activation, cleaning the activated powder by absolute ethanol and/or absolute methanol via ultrasonic cleaning for 10 min, and filtrating and drying the activated powder to obtain a surface activated powder.

Step 2: The surface activated powder was added into a chemical nickel plating solution to perform ultrasonic dispersion for 10 min. Wherein the used chemical nickel plating solution was composed of 30 g of nickel chloride, 15 g of sodium hypophosphite, 15 g of sodium acetate, 15 g of sodium citrate, 5 g of succinic acid, 5 g of glycine, 10 ml of glycerol, 20 ml of glacial acetic acid and 970 ml of distilled water. The pH value of the solution was 4.0. After ultrasonic dispersion, process A was performed. The used process A was as follows: ultrasonic dispersion was performed for 10 min; then, still standing was performed for 0.5 h; next, stirring was performed for 3 min at a stirring speed of 100 r/min; and next, repeating still standing was performed for 0.5 h. Next, the chemical nickel plating solution containing the iron-based alloy powder prepared by the process A was heated to 95+/−5° C. After the reaction for 2 hrs, an iron-based alloy bulk coated with nickel was obtained. The size of the alloy bulk was regulated to 10×10 mm, and a thickness of 132 μm.

Step 3: The sample of the iron-based alloy bulk coated with nickel obtained in step 2 was flatly ground by waterproof sandpaper of 400-2000 meshes, and the sample was broken in the grinding process.

Since the embedding temperature was too high, the plating on the surface of the powder sample was loose, there were a great number of pores between the powders, and the powders fell off from an embedding matrix in the grinding process, finally resulting in the breakage of the sample.

What is claimed is:

1. A preparation method for an iron-based alloy powder EBSD test sample, comprising the following steps:
   step 1, iron-based powder surface electrolytic activation: soaking an iron-based alloy powder into an electrolytic solution for surface activation by an electrolytic activation to obtain an activated powder; and then cleaning the activated powder by an absolute ethanol and/or an absolute methanol via ultrasonic cleaning; finally, drying the activated powder to obtain a surface activated powder;
   step 2, adding the surface activated powder to a chemical embedding solution, then dispersing the surface activated powder in the chemical embedding solution by ultrasonic mixing to obtain a mixture; performing a process; and then heating the mixture to 80-92° C. for a chemical reaction to obtain an iron-based alloy bulk coated with nickel; wherein the process is as follows: a process of still standing, stirring, and repeating the still standing is taken as a cycle, and at least one cycle is performed to complete the process; wherein the chemical embedding solution comprises the following components:
   28-32 g/L of nickel chloride;
   15-30 g/L of sodium hypophosphite;
   14-16 g/L of sodium acetate;
   14-16 g/L of sodium citrate;
   4-6 g/L of succinic acid;
   5-15 g/L of glycine;
   1-3 vol./% of glycerol; and
   1-3 vol./% of glacial acetic acid; a pH value of the chemical embedding solution is 3.5-5.4; and
   step 3, grinding and electropolishing the iron-based alloy bulk coated with nickel obtained in step 2 to obtain the iron-based alloy powder EBSD test sample.

2. The preparation method for the iron-based alloy powder EBSD test sample according to claim 1, wherein the iron-based alloy powder is a gas-atomized Fe-based alloy powder, or a mechanical alloyed iron-based alloy powder, or an iron-based alloy powder prepared by ball milling.

3. The preparation method for the iron-based alloy powder EBSD test sample according to claim 1, wherein an average particle size of the iron-based alloy powder is less than or equal to 150 μm.

4. The preparation method for the iron-based alloy powder EBSD test sample according to claim 1, wherein
   the iron-based powder surface electrolytic activation in step 1 is as follows: filling the iron-based alloy powder into a spoon-shaped copper electrode to perform the electrolytic activation on a surface of the iron-based alloy powder to obtain the activated powder; and cleaning the activated powder by the absolute ethanol using an ultrasonic cleaning machine, and drying the activated powder for subsequent use;
   the electrolytic solution in step 1 is composed of the following components: 0.5-1 wt. % of perchloric acid, 0.05-0.15 wt. % of glycerol and a balance of absolute ethanol or absolute methanol;
   in step 1, a time of the electrolytic activation is 30-60 s, and a temperature of the electrolytic activation is 25-30° C.; and in step 1, a time of the cleaning is 10-15 min, and the absolute ethanol and/or the absolute methanol are/is replaced for 2-3 times during the time of the cleaning.

5. The preparation method for the iron-based alloy powder EBSD test sample according to claim 1, wherein
in step 2, the surface activated powder is added into the chemical embedding solution according to a solid-to-liquid mass ratio of (1-3):500; and
in step 2, a time of the dispersing is 10-15 min.

6. The preparation method for the iron-based alloy powder EBSD test sample according to claim 1, wherein in step 2, a time of each of the still standing is 30-60 min; a speed of the stirring is 100-120 r/min, and a time of each of the stirring is 3-5 min; a time of repeating the still standing is 30-60 min.

7. The preparation method for the iron-based alloy powder EBSD test sample according to claim 1, wherein in step 2, after the process, heating the mixture to 88-92° C. for the chemical reaction for 2-3.5 hrs; and a nickel growth rate is controlled at 30-50 μm/h during the chemical reaction.

8. The preparation method for the iron-based alloy powder EBSD test sample according to claim 1, wherein after the chemical reaction, the iron-based alloy bulk coated with nickel is regulated to have a size of 10×10 mm and a thickness of 50-200 μm; then, the iron-based alloy bulk coated with nickel is flatly ground by a waterproof sandpaper of 400-2000 meshes, and is finally polished by a SiC sandpaper of 2000-3000 meshes; and no scratch exists on the surface of the sample.

9. The preparation method for the iron-based alloy powder EBSD test sample according to claim 1, wherein in step 3, the electropolishing is performed in an electropolishing solution, and the electropolishing solution is composed of 3-10 wt. % of perchloric acid, 1-2 wt. % of glacial acetic acid, 0.5-1 wt. % of phosphoric acid, 1-2 wt. % of glycerol and a balance of absolute methanol and/or absolute ethanol.

10. The preparation method for the iron-based alloy powder EBSD test sample according to claim 1, wherein in step 3, in the electropolishing, a stainless steel plate with a size of 5×3 cm is used as a cathode, the iron-based alloy bulk coated with nickel to be electropolished is used as an anode, a sample clamp is pure copper, a polishing surface right faces the cathode, and an electrolysis is performed by applying a constant voltage of 3-6 V at room temperature for 10-30 s to obtain the iron-based alloy powder EBSD test sample.

* * * * *